(12) United States Patent
Donabedian et al.

(10) Patent No.: US 9,771,108 B2
(45) Date of Patent: Sep. 26, 2017

(54) VEHICLE BODY ASSEMBLY AND METHOD OF JOINING VEHICLE BODY COMPONENTS

(71) Applicant: FORD GLOBAL TECHNOLOGIES, LLC, Dearborn, MI (US)

(72) Inventors: Edgar Edward Donabedian, Livonia, MI (US); Darrin Neil Wagner, Bloomfield Hills, MI (US); Azaz Khatri, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/816,297

(22) Filed: Aug. 3, 2015

(65) Prior Publication Data
US 2017/0036706 A1 Feb. 9, 2017

(51) Int. Cl.
| | |
|---|---|
| *B62D 25/02* | (2006.01) |
| *B62D 25/06* | (2006.01) |
| *B62D 25/07* | (2006.01) |
| *B62D 27/02* | (2006.01) |
| *B62D 27/06* | (2006.01) |
| *B60R 13/04* | (2006.01) |
| *B60R 13/07* | (2006.01) |

(52) U.S. Cl.
CPC .......... *B62D 27/023* (2013.01); *B60R 13/04* (2013.01); *B60R 13/07* (2013.01); *B62D 25/02* (2013.01); *B62D 25/06* (2013.01); *B62D 25/07* (2013.01); *B62D 27/065* (2013.01)

(58) Field of Classification Search
CPC ...... B62D 25/06; B62D 25/07; B62D 27/065; B62D 25/02; B62D 27/023; B60R 13/04; B60R 13/07

USPC ...................... 296/210, 208, 203.03, 29, 213
See application file for complete search history.

(56) References Cited

U.S. PATENT DOCUMENTS

| | | | |
|---|---|---|---|
| 4,157,674 A | 6/1979 | Carlson et al. | |
| 4,254,986 A * | 3/1981 | Nakamura | B60R 13/00 296/210 |
| 4,883,310 A * | 11/1989 | Miyazaki | B62D 25/06 29/469 |
| 4,900,083 A * | 2/1990 | Kumasaka | B62D 23/00 29/469 |
| 4,957,326 A * | 9/1990 | Chiba | B62D 25/06 296/193.03 |
| 5,018,781 A * | 5/1991 | Kumasaka | B62D 25/06 296/193.03 |

(Continued)

FOREIGN PATENT DOCUMENTS

| | | |
|---|---|---|
| CN | 202806590 U | 3/2013 |
| CN | 202863356 U | 4/2013 |
| JP | 2006282119 A | 10/2006 |

*Primary Examiner* — Gregory Blankenship
(74) *Attorney, Agent, or Firm* — Jason Rogers; Brooks Kushman P.C.

(57) ABSTRACT

A vehicle assembly is provided. The vehicle assembly includes a roof panel, a bodyside panel and a bolt. The roof panel and bodyside panel collectively form a roof ditch. The bolt includes a stud that has first and second distal portions. The first and second distal portions include first and second threaded portions, respectively. The first distal portion extends outwardly from one of the roof and bodyside panels and the second distal portion extending outwardly from the other of the roof and bodyside panels and into the roof ditch.

20 Claims, 2 Drawing Sheets

(56) References Cited

U.S. PATENT DOCUMENTS

| | | | | |
|---|---|---|---|---|
| 6,012,766 | A * | 1/2000 | Myles | B60R 9/045 296/203.03 |
| 6,341,917 | B1 | 1/2002 | Schubring et al. | |
| 6,592,177 | B1 * | 7/2003 | Mathew | B62D 25/06 296/102 |
| 6,974,181 | B2 * | 12/2005 | Mikkaichi | B60R 13/04 296/210 |
| 7,029,060 | B1 * | 4/2006 | Osterberg | B60R 13/04 296/203.03 |
| 8,677,572 | B2 * | 3/2014 | Scroggie | B60R 13/04 24/292 |
| 8,820,824 | B1 * | 9/2014 | Hinz | B62D 29/008 296/187.13 |
| 9,022,264 | B2 | 5/2015 | Jutila et al. | |
| 2007/0001484 | A1 * | 1/2007 | Okamoto | B62D 25/161 296/193.05 |
| 2008/0148518 | A1 * | 6/2008 | Munenaga | B60J 5/107 16/334 |
| 2008/0191444 | A1 * | 8/2008 | Stahel | B60B 7/14 280/154 |
| 2011/0010898 | A1 * | 1/2011 | Scroggie | B60R 13/04 24/292 |
| 2011/0018311 | A1 * | 1/2011 | Burns | B29C 70/74 296/210 |
| 2017/0036706 | A1 * | 2/2017 | Donabedian | B62D 27/023 |

* cited by examiner

US 9,771,108 B2

VEHICLE BODY ASSEMBLY AND METHOD OF JOINING VEHICLE BODY COMPONENTS

TECHNICAL FIELD

The present disclosure relates to vehicular body and frame structures.

BACKGROUND

A variety of methods may be used to secure or join a roof panel to the body of a vehicle. The methods include spot welding, laser welding, and using self-piercing rivets.

SUMMARY

A vehicle assembly is provided. The vehicle assembly includes a roof panel, a bodyside panel and a bolt. The roof panel and bodyside panel collectively form a roof ditch. The bolt includes a stud that has first and second distal portions. The first and second distal portions include first and second threaded portions, respectively. The first distal portion extends outwardly from one of the roof and bodyside panels and the second distal portion extending outwardly from the other of the roof and bodyside panels and into the roof ditch.

A vehicle is provided. The vehicle includes a roof panel, a bodyside panel, and a bolt. The roof and bodyside panel collectively form a roof ditch. The bolt include a nut portion, a first threaded portion, and a second threaded portion. The first and second threaded portions extend from the nut portion in opposing directions. The first threaded portion extends through aligned apertures defined in the roof and bodyside panels and the second threaded portion extends outwardly from the roof and bodyside panels and into the roof ditch. An elongated trim component is disposed partially within the roof ditch and secured to the second threaded portion.

A method of joining vehicle body components is provided. The method includes providing a bolt that includes first and second threaded portions and securing a roof panel to a bodyside panel with the bolt such that the roof and bodyside panels form a roof ditch, the first threaded portion extends outwardly from one of the roof and bodyside panels, and the second threaded portion extends outwardly from the other of the roof and bodyside panels and into the roof ditch.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
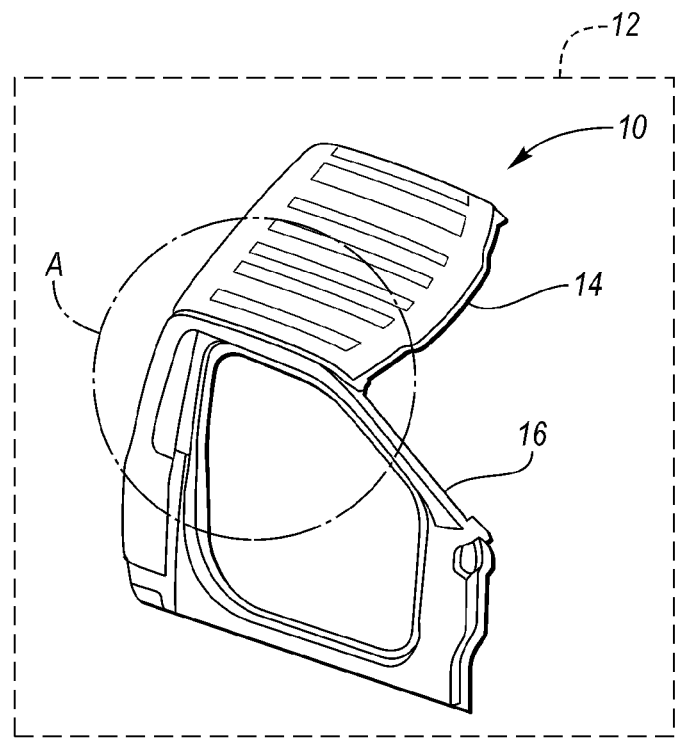
FIG. 1 is isometric view of a vehicle body assembly including a roof panel and a bodyside panel.
Figure 2:
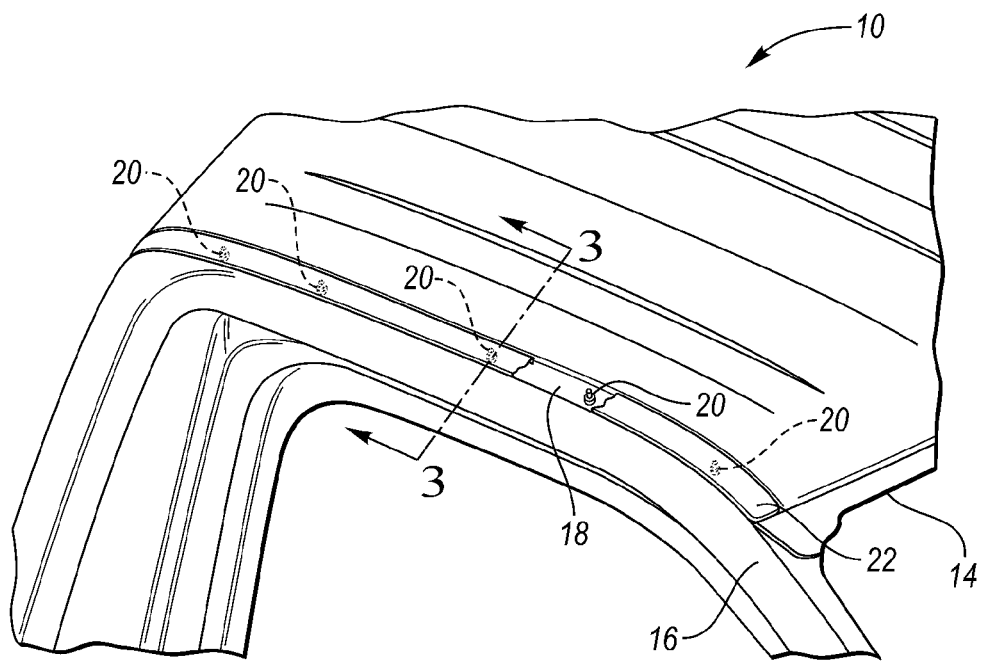
FIG. 2 is a magnified view of Detail A in FIG. 1.

Referring to FIGS. 1 and 2, a body assembly 10 of a vehicle 12 is illustrated. The body assembly 10 includes a roof panel 14 and a bodyside panel 16. The roof panel 14 and the bodyside panel 16 may form a roof ditch 18. The roof panel 14 and bodyside panel 16 may be secured to a series of bolts 20 in order to attach the roof panel 14 to the bodyside panel 16. The roof panel 14 and bodyside panel 16 may be secured to bolts 20 along the roof ditch 18. An elongated trim component 22 may also be secured to the bolts 20. The trim component 22 may be a roof ditch molding that is secured to the bolts 20 and is located entirely or partially within the roof ditch 18. A roof ditch molding is a component that is used to fill the void of the roof ditch 18 in order to enhance aesthetic appeal to the vehicle 12.

Figure 3:
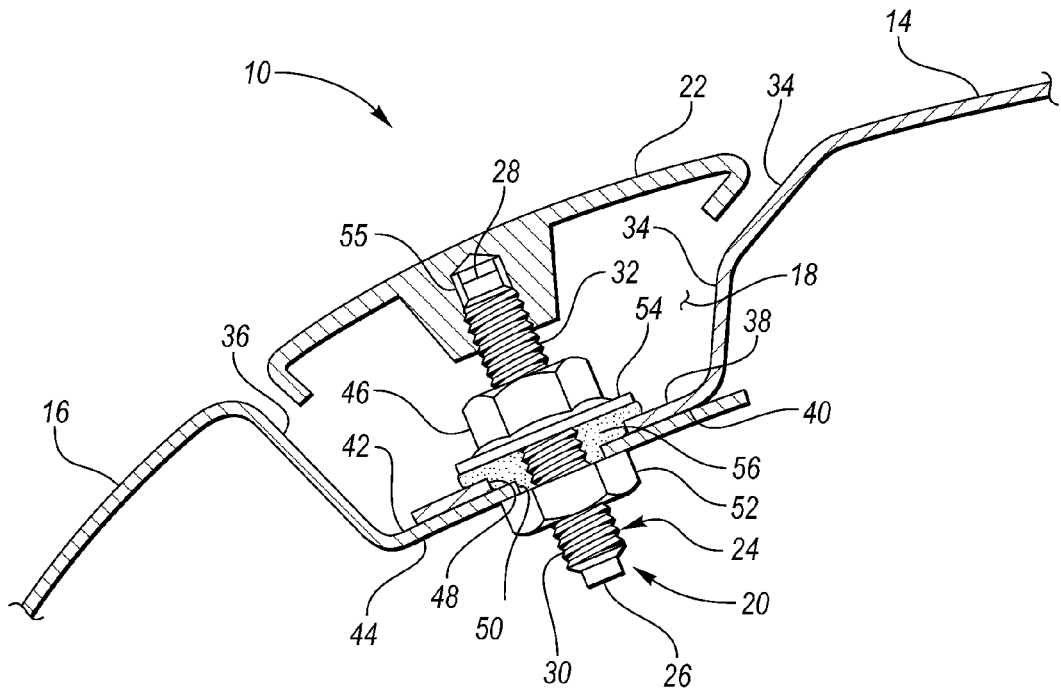
FIG. 3 is a cross sectional view of the vehicle body assembly taken along line 3-3 in FIG. 2.

Referring to FIG. 3, a cross sectional view of the body assembly 10 taken along line 3-3 in FIG. 2 is illustrated. The bolt 20 may be a double ended bolt as depicted in FIG. 3. The bolt 20 is shown to have a stud 24 that includes a first distal portion 26 and a second distal portion 28. The first distal portion 26 may include a first threaded portion 30 and the second distal portion 28 may include a second threaded portion 32. The first distal portion 26 and first threaded portion 30 may extending outwardly from the roof panel 14 or the bodyside panel 16 while the second distal portion 28 and second threaded portion 32 extend outwardly from the other of the roof panel 14 or bodyside panel 16. The second distal portion 28 and second threaded portion 32 may be located within the roof ditch 18. More specifically the second distal portion 28 and second threaded portion 32 may be located entirely within the roof ditch 18.

The roof panel 14 and bodyside panel 16 may include opposing side surfaces and overlapping base surfaces that define the roof ditch 18. The opposing side surfaces may include one or more side surfaces 34 of the roof panel 14 and one or more side surfaces 36 of the bodyside panel 16. The side surfaces 34, 36 may taper outwardly with respect to the bolt 20 and/or the roof ditch 18. The overlapping base surfaces may include a top surface 38 of the roof panel 14, a bottom surface 40 of the roof panel 14, a top surface 42 of the bodyside panel 16, and a bottom surface 44 of the bodyside panel 16.

The bolt 20 may include a nut portion 46. The nut portion 46 may be disposed between the first threaded portion 30 and the second threaded portion 32 such that the first threaded portion 30 and second threaded portion 32 extend from the nut portion 46 in opposing directions. The nut portion 46 may be disposed within the roof ditch 18 and may be adjacent to the overlapping base surfaces. The first distal portion 26 and first threaded portion 30 of the bolt 20 may extend through aligned apertures in the overlapping base surfaces. The aligned apertures may include a first aperture 48 in the roof panel 14 and a second aperture 50 in the bodyside panel 16. An opposing nut 52 may be secured to the first distal portion 26 and first threaded portion 30 of the bolt 20. The bolt 20 and opposing nut 52 are not shown as cross sections in FIG. 3 for clarity purposes. The opposing nut 52 may be disposed adjacent to the overlapping base surfaces opposite of the nut portion 46 of the bolt 20. The opposing nut 52 may be a pierce nut or self-piercing nut may be rigidly attached to either the roof panel 14 or the bodyside panel 16. Furthermore, the bolt 20 may include washer portion 54 that is adjacent to the nut portion 46.

Elongated trim component 22 may be secured to the second distal portion 28 and second threaded portion 32 of the bolt 20. The elongated trim component 22 may include a threaded aperture 55 that engages the second threaded portion 32 in order to secure the trim component 22 to the second distal portion 28 of the bolt 20.

Utilizing bolts 20 to secure the roof panel 14 to the bodyside panel 16 provides additional strength in order to secure the position of the roof panel 14 during a safety event, such as an impact. Current methods of attaching the roof panel 14 to the bodyside panel 16 such as spot welding, laser welding, or using self-piercing rivets, may not provide certain strength characteristics. Furthermore, bolts 20 allow for a variety of sheet-metal gauges to be used for either the roof panel 14 or the bodyside panel 16, which may be required for different applications. Current proposals of attaching the roof panel 14 to the bodyside panel 16 utilize only sheet-metal gauges based on depth limitations of welding or riveting processes.

Furthermore, locating and attaching trim components 22 (such as a roof ditch moldings) with double ended bolts reduces the need for additional hardware, such as attachment brackets, that may be required to secure the trim components 22 to the vehicle 12.

A seal 56 may be disposed on or adjacent to the bolt 20 in order to prevent water, dust, dirt, or other contaminants from moving from one side of the body assembly 10 to the other side of the body assembly 10 through any space or void located between the bolts 20, roof panel 14, bodyside panel 16, or opposing nut 52. For example, the seal 56 may prevent contaminants from flowing past the nut portion 46 or washer portion 54 and into the aligned apertures 48, 50 in the roof panel 14 and bodyside panel 16.

The seal 56 may be disposed between either the roof panel 14 or bodyside panel 16 and the bolt 20. Specifically, the seal 56 may be disposed between the bolt 20 and the overlapping surfaces of the roof panel 14 and bodyside panel 16. More, specifically, the seal 56 may be disposed between the nut portion 46 and the overlapping surfaces of the roof panel 14 and bodyside panel 16. Alternatively, if the bolt includes the washer portion 54, the seal 56 may be disposed between the washer portion 54 and the overlapping surfaces of the roof panel 14 and bodyside panel 16.

The seal 56 may be an integral part of the bolt 20. For example, the seal 56 may be adhered to the nut portion 46 or washer portion 54 prior to connecting the roof panel 14 and bodyside panel 16 to the bolt 20.

Figure 4:
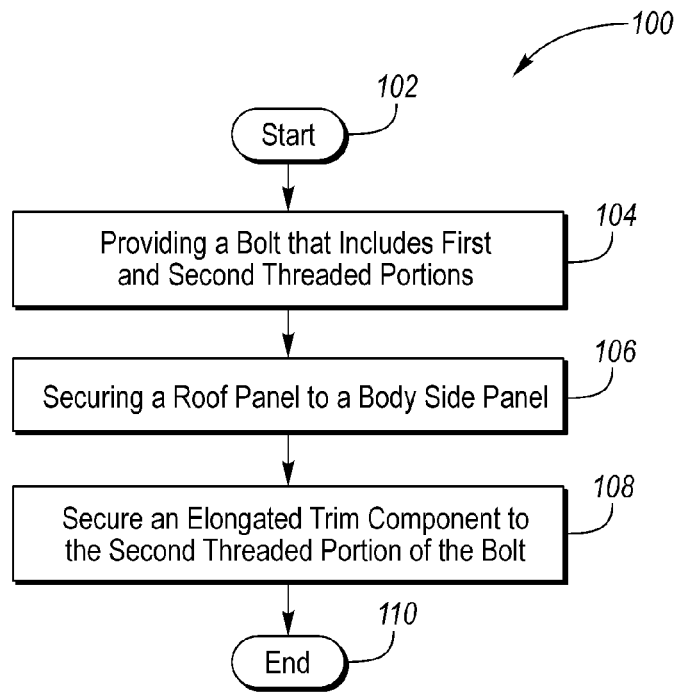
FIG. 4 is a flowchart depicting the steps of a method of joining vehicle body components.

Referring to FIG. 4, a method of method of joining vehicle body components is illustrated. The method 100 is initiated at the start block 102. Once the method 100 has been initiated at the start block 102, the method moves on to step 104 where a bolt is provided that includes first and second threaded portions.

Next, of the method 100 moves on to step 106 were a roof panel is secured to a bodyside panel with the bolt provided in step 104 such that the roof and bodyside panels form a roof ditch, the first threaded portion extends outwardly from one of the roof and bodyside panels, and the second threaded portion extends outwardly from the other of the roof and bodyside panels and into the roof ditch.

Once the roof panel is secured to the bodyside panel in step 106, the method 100 moves on to step 108 where an elongated trim component is secured to the second threaded portion of the bolt. Once the trim component is secured to the second threaded portion of the bolt, the method ends at step 110.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle assembly comprising:
   roof and bodyside panels collectively forming a roof ditch and having overlapping base surfaces that define aligned apertures;
   a bolt having a stud including first and second threaded portions, the first threaded portion extending downward through the aligned apertures and below the base surfaces, the second threaded portion extending upward from the base surfaces and into the roof ditch; and
   a seal disposed within the aligned apertures.

2. The vehicle assembly of claim 1, wherein the bolt includes a nut portion that is disposed within the roof ditch and is adjacent to the overlapping base surfaces.

3. The vehicle assembly of claim 2, wherein the seal is disposed between the nut portion and one of the overlapping base surfaces.

4. The vehicle assembly of claim 2, further comprising an opposing nut secured to the first threaded portion, wherein the opposing nut is disposed adjacent to the overlapping base surfaces opposite of the nut portion.

5. The vehicle assembly of claim 1, wherein the second threaded portion is located entirely within the roof ditch.

6. The vehicle assembly of claim 5, wherein an elongated trim component is secured to the second threaded portion of the bolt.

7. The vehicle assembly of claim 6, wherein the elongated trim component defines a threaded aperture engaging the second threaded portion to secure the elongated trim component to the second threaded portion.

8. The vehicle assembly of claim 6, wherein the elongated trim component is disposed partially within the roof ditch.

9. The vehicle assembly of claim 1, wherein the seal completely fills the aligned apertures.

10. The vehicle assembly of claim 4, wherein the seal extends from the nut portion of the bolt, through the aligned apertures, and to the opposing nut.

11. A vehicle comprising:
    a roof and a bodyside panel collectively forming a roof ditch and having overlapping base surfaces that define aligned apertures;
    a bolt having a nut portion and first and second threaded portions extending from the nut portion in opposing directions, the first threaded portion extending through the aligned apertures and outwardly from one of the roof and bodyside panels, the second threaded portion extending outwardly from the other of the roof and bodyside panels and into the roof ditch;

a seal disposed within the aligned apertures; and an elongated trim component disposed partially within the roof ditch and secured to the second threaded portion.

12. The vehicle of claim 11, wherein the nut portion is disposed within the roof ditch and is adjacent to the overlapping base surfaces.

13. The vehicle of claim 12, wherein the seal is disposed between the nut portion and the overlapping base surfaces of the roof and bodyside panels.

14. The vehicle of claim 12, further comprising an opposing nut secured to the first threaded portion, wherein the opposing nut is disposed adjacent to the overlapping base surfaces opposite the nut portion.

15. The vehicle of claim 11, wherein the second threaded portion is located entirely within the roof ditch.

16. The vehicle of claim 15, wherein the elongated trim component defines a threaded aperture that engaging the second threaded portion to secure the elongated trim component to the second threaded portion.

17. The vehicle of claim 11, wherein the seal completely fills the aligned apertures.

18. The vehicle of claim 14, wherein the seal extends from the nut portion of the bolt, through the aligned apertures, and to the opposing nut.

19. A method of joining vehicle body components comprising:

providing a bolt that includes first and second threaded portions;

securing a roof panel to a bodyside panel with the bolt, the roof and bodyside panels forming a roof ditch and having overlapping surfaces that define aligned apertures, the first threaded portion extends through the aligned apertures and outwardly from one of the roof and bodyside panels, and the second threaded portion extends outwardly from the other of the roof and bodyside panels and into the roof ditch; and providing a seal disposed within the aligned apertures.

20. The method of claim 19, wherein the seal completely fills the aligned apertures.

* * * * *